US005628831A

United States Patent [19]

Williamson et al.

[11] Patent Number: 5,628,831
[45] Date of Patent: May 13, 1997

[54] METHOD FOR CLEANING CONTAMINANTS FROM A BODY IN SPACE USING A SPACE CHARGE NEUTRAL PLASMA

[75] Inventors: Weldon S. Williamson, Malibu; Barret Lippey, Gardena; John D. Williams, Agoura Hills, all of Calif.

[73] Assignee: Hughes Aircraft Company, Los Angeles, Calif.

[21] Appl. No.: 383,290

[22] Filed: Feb. 3, 1995

Related U.S. Application Data

[62] Division of Ser. No. 113,144, Aug. 27, 1993, Pat. No. 5,418,431.
[51] Int. Cl.$^6$ .................................................. B08B 7/04
[52] U.S. Cl. .................................. 134/1.1; 315/111.51
[58] Field of Search .................... 134/1.1, 1; 315/111.21, 315/111.51, 111.87, 111.41; 118/723 AN, 723 E, 723 I; 313/231.31

[56] References Cited

U.S. PATENT DOCUMENTS

| 4,088,926 | 5/1978 | Fletcher . | |
|---|---|---|---|
| 4,786,352 | 11/1988 | Benzing | 134/1.1 X |
| 4,800,281 | 1/1989 | Williamson | 250/427 |
| 4,846,425 | 7/1989 | Champetier | 134/1 X |
| 4,977,352 | 12/1990 | Williamson | 315/111.81 |
| 5,146,137 | 9/1992 | Gesche et al. | 315/111.21 |
| 5,397,962 | 3/1995 | Moslehi | 315/111.51 |

FOREIGN PATENT DOCUMENTS

| 0403418 | 12/1990 | European Pat. Off. . |
| 0124312 | 7/1985 | Japan . |
| 3197682 | 8/1991 | Japan . |
| 8702603 | 5/1987 | WIPO . |

OTHER PUBLICATIONS

Chen, "Plasma Ionization by Helicon Waves", *Plasma Physics and Controlled Fusion*, vol. 33, No. 4, 1991, pp. 339–364.

Singer, "Trends in Plasma Sources: The Search Continues" *Semiconductor International*, Jul. 1992, pp. 52–57.
Watari et al., "Radio Frequency Plugging of a High Density Plasma", *Physics of Fluids*, vol. 21, No. 11, Nov. 1978, pp. 2076–2081.
"Adapting Military Technology to Civilian Use: Contamination Removal and Collection Techniques", Microcontamination May 1993, pp. 21–27.
"Ion Cleaning of Silicone–Based Contaminants", J. F. Froechtenigt, et al., 1989 IEEE, pp. 393–398.
"On–orbit Ion Cleaning of Cryogenic Optical Surfaces", B. Lippey et al., SPIE vol. 1754 Optical System Contamination (1992) pp. 314–323.

(List continued on next page.)

*Primary Examiner*—Jill Warden
*Assistant Examiner*—Saeed Chaudhry
*Attorney, Agent, or Firm*—V. D. Duraiswamy; W. K. Denson-Low

[57] ABSTRACT

Contaminants are cleaned from the surface of a body in space by generating a substantially space-charge neutral reactive plasma, directing the plasma onto the contaminated surface at an energy below the surface sputtering energy (typically 20 eV), and reacting the plasma with the contaminants to remove them. A helicon wave plasma source is made light weight and compact enough for spacecraft use, with a plasma energy low enough to avoid damaging optical surfaces, by using permanent magnets to establish a static axial magnetic field, and a simple but novel rf antenna design. The antenna consists of a pair of spaced conductive rings which extend around the plasma tube, with conductive base and rf feed bars extending between the rings on diametrically opposite sides. The feed bar is interrupted to provide an rf input on opposite sides of the interruption. The antenna is preferably formed as an integral metal unit, with its rings rigidly supported by and integral with opposite ends of the base bar. The plasma source is also useful in neutralizing localized charges on the spacecraft.

10 Claims, 2 Drawing Sheets

OTHER PUBLICATIONS

Patent Abstracts of Japan, vol. 14, No. 455 (E–985) Sep. 28, 1990 & JP–A–02 183 531 (Osaka Titanium) Jul. 18, 1990, abstract.

Patent Abstracts of Japan, vol. 13, No. 134 (C–581) Apr. 4, 1989 & JP–A–63 297 547 (Nippon T&T) Dec. 5, 1988, abstract.

Patent Abstracts of Japan, vol. 12, No. 82 (C–481) Mar. 15, 1988 & JP–A–62 216 638 (Anelva) Sep. 24, 1987, abstract.

METHOD FOR CLEANING CONTAMINANTS FROM A BODY IN SPACE USING A SPACE CHARGE NEUTRAL PLASMA

This is a division of application Ser. No. 08/113,144 filed Aug. 27, 1993, U.S. Pat. No. 5,418,431.

BACKGROUND OF THE INVENTION

1. Field of the Invention

This invention relates to rf plasma sources and the use of such sources for cleaning surfaces in space, and more particularly to helicon wave plasma sources suitable for cleaning spacecraft thermal radiators and telescopes.

2. Description of the Related Art

There is a need for a low power, self-contained cleaning system for removing contaminants that build up on the exposed surfaces of a spacecraft, without damaging the device being cleaned. For example, thermal radiators are used to cool a spacecraft by radiating more energy than they absorb. This results from their having a high emissivity in the infrared (IR) wavelengths corresponding to blackbody radiation from the warm spacecraft, and a low absorbtance over the wavelengths of the solar spectrum.

Thermal radiators become contaminated in space due to the condensation of hydrocarbon vapors outgassed from organic materials carried onboard the spacecraft, such as adhesives, potting compounds, conformal coatings and thermal blankets. Ultraviolet light from the sun causes photopolymerization of the hydrocarbons, which would otherwise re-evaporate to some degree; this generates high molecular weight films that do not re-evaporate. These contaminants can greatly increase the radiator's solar absorbtance, and thus reduce its cooling capacity. To counter this, extra large radiator panels are typically used. The extra radiators not only add weight and cost to the spacecraft, but also cool the spacecraft excessively before they become contaminated. This requires valuable onboard electrical power to be used to heat the radiators; the greatest heating is needed during eclipse seasons, when power is least available. Near the end of the spacecraft life, the radiators exhibit a poor heat rejection performance that can cause the onboard electronics to be subjected to large thermal extremes, thereby reducing their lifetime and reliability.

Imaging optics such as telescopes that are used on spacecraft also become contaminated in this way. The condensed hydrocarbon vapors form a scum that causes absorption and scattering of the light being imaged by the telescope, blurring the images. This contamination process is significantly worsened if the telescope is designed to view the sun, which result in the photopolymerization mentioned above.

Telescopes that are cooled to cryogenic temperatures, on the order of tens of Kelvins, to permit observations in the infrared, are also subject to a buildup of surface contaminants. Such cryotelescopes suffer from condensation not only of hydrocarbon vapors, but also of water vapor, carbon dioxide, ammonia and other cryocondensible gases. The frozen gases absorb incident radiation, and in time become roughened by sublimation roughening, increasing their optical scatter. Cryotelescopes have previously been warmed to sublime the frozen gases. However, this renders the instrument "blind" during the sublimation process, and consumes a great deal of cryogen. The residual hydrocarbon contaminants have been simply allowed to accumulate.

Previous attempts to develop a cleaner for space borne telescope optics used high energy ion beams to remove the contaminants. However, this resulted in damage to the delicate optical surfaces because of ion beam sputtering. Radiators often use conductive coatings such as indium oxide, and the potential for sputter damage to such coatings has also made ion beam cleaning inapplicable to radiators.

Another approach involves the use of an ultraviolet lamp to create ozone within the telescope tube. The ozone oxidizes hydrocarbon contaminants on the telescope optics. Unfortunately, this approach requires the telescope tube to be pressurized with oxygen gas, which imposes a substantial burden upon the spacecraft in terms of telescope mass, large oxygen tankage and cryogen loss due to convective warming during cleaning.

Another approach to cleaning spacecraft surfaces is described in U.S. Pat. No. 4,846,425 to Champetier and assigned Hughes Aircraft Company, the assignee of the present invention. This technique uses the negative charge that is typically accumulated on a spacecraft, which collects more active electrons than relatively inactive positive ions. Neutral oxygen is released from the spacecraft, ionized by the background space plasma, and drawn back to the spacecraft by its negative charging to react with the surface contaminants. A very large oxygen supply is required, however, because most of the oxygen escapes and is not drawn back to the spacecraft. This is because the oxygen must be ionized within a few debye lengths (about 10–100 m) from the spacecraft to be drawn back, and the majority of the oxygen is not ionized within this zone.

The use of plasmas is well known in ground applications for removing hydrocarbons. Nascent oxygen atoms and ions in the plasma oxidize the hydrogen and carbon atoms that make up the contaminants, and the reaction energy propels the volatile oxide from the contaminated surface. One type of plasma source that has been used for this purpose is based upon a Penning electron discharge; such a plasma source is described in U.S. Pat. No. 4,800,281, also assigned to Hughes Aircraft Company. Penning-type sources generally include either a filamentary cathode or a hollow cathode for achieving thermionic electron emission. However, filamentary cathodes predictably burn out over time, and are therefore unacceptable for use in spacecraft applications in which replacement of the cathode is not possible. For hollow cathodes, the electronic emissive material that is used to coat the hollow cathode is often incompatible with reactive gases such as oxygen that are desirable plasma fuels for cleaning optical surfaces.

Another plasma source that has been used for ground-based cleaning applications is the helicon wave source. This type of device operates by coupling externally generated electric and magnetic fields into a plasma that is confined by an axial magnetic field. An antenna consisting of two loops diametrically positioned on the outside of the source tube produces a transverse rf magnetic field, perpendicular to both the tube axis and a constant axial magnetic field. The rf field excites a helicon wave in the source tube, and energy is transferred from this wave to the plasma electrons. The helicon wave theory is discussed in Chen, "Plasma Ionization By Helicon Waves", *Plasma Physics and Controlled Fusion*, Vol. 33, No. 4, 1991, pages 339–364. The use of helicon wave plasma sources for semiconductor cleaning is described in Singer, "Trends in Plasma Sources: The Search Continues", *Semiconductor International*, July 1992, pages 52–57.

Helicon plasma sources use versions of an rf antenna that have complicated wiring schemes to avoid establishing an rf magnetic field parallel to the source tube axis. This type of antenna, commonly referred to as a Nagoya Type III antenna, is described in Watari et al., "Radio Frequency Plugging of a High Density Plasma", *Physics of Fluids*, Vol. 21, No. 11, November 1978, pages 2076–2081. The overall plasma sources are quite large and massive, and consume too much power and gas to be considered for spacecraft applications.

Other reactive plasma sources such as parallel-plate reactors are also used to clean hydrocarbons in ground applications. In addition to excessive weight and power consumption, those sources produce ion energies high enough to risk damaging optical surfaces.

SUMMARY OF THE INVENTION

The present invention seeks to provide an improved method for removing contaminants from the surface of a body in space with low power and gas consumption requirements, and without damaging the surface being cleaned. In particular, it seeks to provide a reactive rf plasma source that has these characteristics and is small enough in size to be useful for practical spacecraft applications. A neutralization of charge buildup on the spacecraft surface is also desired.

These goals are achieved by generating a substantially space-charge neutral plasma of a type that reacts with the contaminant to be removed from the spacecraft surface, directing the plasma onto the contaminated surface at an energy below the surface sputtering energy, and reacting the plasma with the contaminant to remove it from the surface. A new type of helicon wave source is used to provide the plasma at a low energy level, less than 20 eV, at which sputter damage to delicate optical surfaces is avoided. The new plasma source can also be made sufficiently compact and light weight to be useful for spacecraft applications. This reduction in scale is made possible by the use of permanent magnets to establish the uniform axial magnetic field, as opposed to the prior use of electromagnets with their attendant high power consumption, coupled with a unique rf antenna design that is greatly simplified compared to the prior Nagoya-type antennas.

The new antenna includes a pair of conductive rings that extend around the tube and are axially spaced from each other. The rings are preferably formed in a unitary construction with a conductive base bar that extends generally parallel to the tube axis, with the rings rigidly supported by and integral with the opposite ends of the base bar. A conductive rf feed bar extends generally parallel to the tube axis between the two rings on the opposite side of the tube from the base bar, with an input rf signal delivered to opposite sides of an interruption in the feed bar. The two rings are designed to divide an rf current from the feed bar symmetrically and then recombine the current in the base bar, thereby avoiding the generation of any substantial net axial rf magnetic field through the tube.

In a preferred embodiment, the feed bar interruption is provided between one of the rings and the adjacent end of the feed bar. Localized enlargements of the ring and feed bar include openings to receive the sheath and inner conductor of a coaxial rf feed cable, respectively. The antenna is durable, easy to assemble to the tube, and contributes to the reduction in overall size.

These and other features and advantages of the invention will be apparent to those skilled in the art from the following detailed description, taken together with the accompanying drawings.

DETAILED DESCRIPTION OF THE INVENTION

Figure 1:
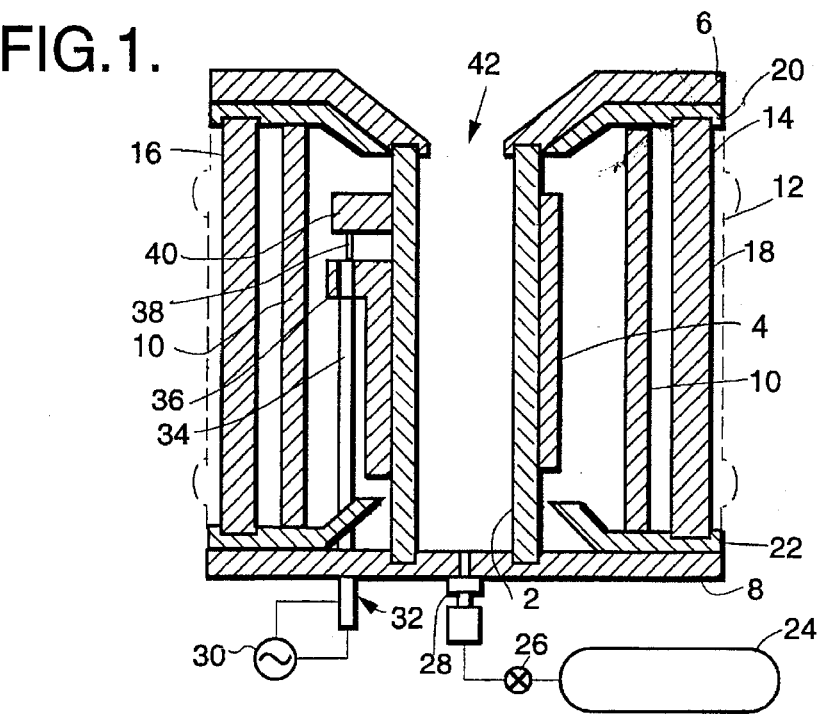
FIG. 1 is a sectional view of a compact rf plasma source in accordance with the invention.

A preferred embodiment of a compact rf plasma source that can be used for orbiting spacecraft is shown in FIG. 1. It includes a cylindrical plasma tube 2, formed from a material such as alumina, ceramic or glass, within which the plasma is generated. An rf antenna 4 is provided around the exterior of the plasma tube and provides a flow path for rf current that generates an oscillating magnetic field (a magnetic dipole) in a plane perpendicular to the tube's axis. The antenna could at least theoretically be located around the interior of the plasma tube, but that would add to the surface area within the tube and thereby increase the rate of plasma recombination loss. As described below, the antenna has a unique configuration that avoids the generation of an oscillating field along the tube axis, and is much simpler in design than the Nagoya-type antennas previously used for this purpose.

The remainder of the assembly is held in place between upper and lower stainless steel endcaps 6 and 8, which are notched to retain the opposite ends of the tube 2. A series of tie bolts 10 are used to secure the endcaps together. An outer wire mesh shield 12 provides additional structural support and protection for the assembly. The antenna 4 is secured against slippage on the plasma tube, such as by a ceramic-to-metal braze.

A number of permanent bar magnets, of which two magnets 14 and 16 are illustrated although typically six-ten magnets would be employed, are provided at various azimuthal positions around a source and housed in a magnet tube 18 that forms a protective housing. The magnets, which can be formed from samarium cobalt or neodymium-iron-boron, establish a magnetic field within the tube that is generally parallel to the tube axis. A cylindrical shell magnet might also be used in place of the bar magnets. The magnetic field is kept generally uniform within the tube through the use of pole pieces 20 and 22 at the upper and lower ends of the assembly. The pole pieces, which are preferably iron or other high permeability magnetic material, are shaped to provide the desired field uniformity; similarly shaped pole pieces are employed in known ion thrusters. The magnet tube 18 is preferably formed from stainless steel to avoid shorting the magnetic circuit.

A plasma source gas is supplied from a gas reservoir 24 through a valve 26 and nipple 28 into the back end of the plasma tube. Oxygen is commonly used as a source gas because it reacts with hydrocarbon contaminants, but other sources such as nitrogen, $CF_4$, argon, air or water vapor could also be used. In general, any gas or vapor that reacts with the contaminant to be removed and does not condense at the plasma source's operating temperature (estimated at about 100° C.) could be considered. Instead of using a valve 26, a heater might be employed to control the gas or vapor flow rate into the plasma tube.

An rf source 30 is coupled to the antenna 4, most conveniently via a coaxial cable 32. The cable includes an outer sheath 34 that is connected to one of the antenna electrodes 36, and an inner conductor 38 that extends through terminal 36 and is connected to a second antenna terminal 40.

If desired, the structure shown in FIG. 1 can be modified to add an additional permanent magnet structure, downstream from the magnet structure illustrated in the figure, to provide a more consistent field gradient that encourages outward plasma drift through the tube's open discharge end 42. This type of magnet configuration is used, for example, in the plasma generator of U.S. Pat. No. 4,977,352 to Williamson, one of the present inventors, assigned to Hughes Aircraft Company.

It has been found that the plasma source illustrated in FIG. 1 can be successfully used to generate a highly reactive plasma that will clean contaminated spacecraft surfaces with low rates of power and gas consumption, and at an energy level below that at which sputter damage to optical surfaces is produced. This is accomplished with a structure that is considerably smaller and lighter than ground based helicon wave plasma sources currently available.

In a typical application of the invention, a 22 mm diameter plasma source is supplied with gas at a flow rate of 0.5–20 sccm (standard (temperature and pressure) $cm^3$/minute). Higher or lower fluences can be obtained by increasing or decreasing the gas flow rate or power. The input rf power is in the 5–25 W range, while the magnets provide an axial field of about 150 milliTesla (the field is somewhat stronger at the pole faces). With an rf frequency of 100 MHz, a maximum oxygen ion current of 50 mA is generated. The energy of the plasma ions and neutrals ranges up to about 15 eV, which is sufficiently below the approximate threshold of 20 eV at which sputter damage to optical surfaces can commence.

Figure 2:
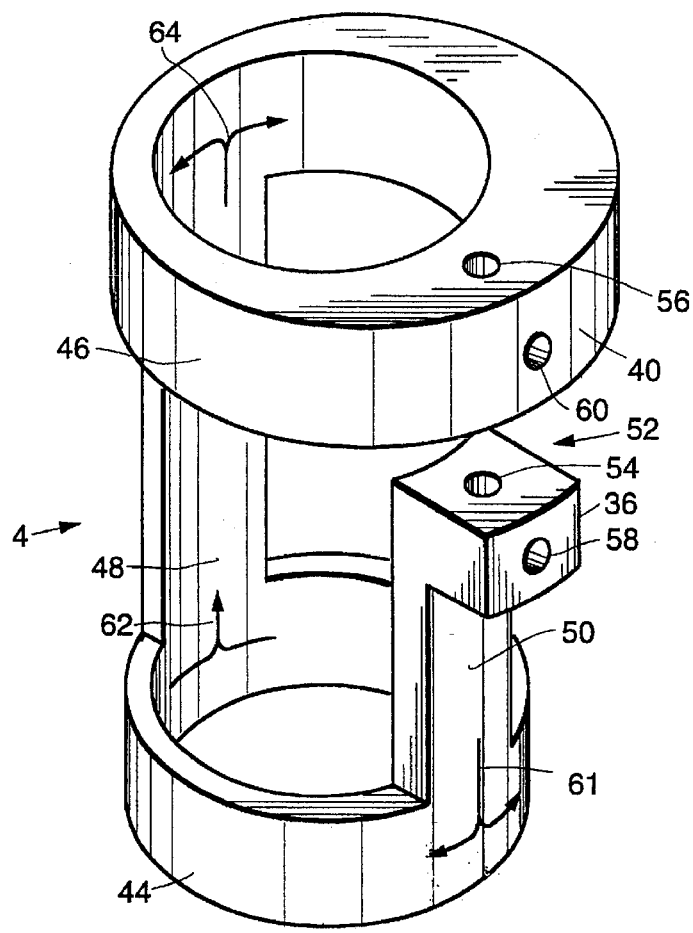
FIG. 2 is a perspective view of an rf antenna used in the plasma source of FIG. 1.

A novel rf antenna configuration that replaces the Nagoya-type antenna and is instrumental in enabling a more compact plasma source is shown in FIG. 2. The antenna 4 is formed from a conductive material such as copper, preferably in a unitary integral construction. The antenna includes a pair of rings 44 and 46 at its opposite ends whose inside diameter is approximately equal to the plasma tube's outer diameter. The two rings are electrically and mechanically connected by a base bar 48, which extends parallel to the common ring/plasma tube axis. The opposite ends of the base bar 48 merge into the rings, and rigidly support them to keep them mutually separated. An rf feeder bar 50 extends between the rings on the diametric opposite side of the antenna from base bar 48. The feeder bar 50 has an interruption 52, allowing the rf signal to be connected across the opposite sides of the interruption. This interruption is preferably between one of the rings 46 and the remainder of the feed bar 50, which extends integrally up from the other ring 44. However, if desired the feed bar can extend in from both rings, with the interruption near its middle.

The terminals 36 and 40 consist of enlarged areas on the opposed ends of the feed bar 50 and upper ring 46. A relatively large axial opening 54 is formed through the feed bar terminal 36 to accommodate the outer sheath of the coaxial cable 32, while a smaller axial opening 56 is formed through the ring terminal 40 to accommodate the cable's inner conductor. Set screw openings 58 and 60 are provided in the terminals perpendicular to the cable openings 54 and 56 so that the cable sheath and inner conductor can be secured in place with set screws. Although the upper ring 46 is illustrated as progressively expanding in width from the base bar 48 to the terminal 40, its width can be held equal to that of the base bar, with a tab on the opposite side of the ring for terminal 40.

The illustrated antenna configuration results in a symmetrical flow of rf current that produces substantially zero net oscillating magnetic field parallel to the tube axis. This is because the antenna provides symmetrical clockwise and counter-clockwise current flow paths around the plasma tube. As illustrated by the arrow 61, the current during one-half of each rf cycle flows from the terminal 36 through the feed bar 50, and divides equally in opposite directions around the lower ring 44. The ring currents recombine at the base bar (arrow 62), and again divide equally in opposite directions around ring 46 at the upper end of the base bar (arrow 64). The upper ring 46 provides a return path to the rf source via terminal 40. This current flow reverses during the other half of the rf cycle, but it still divides symmetrically around the rings and thus avoids the production of a net oscillating magnetic field in the axial direction.

Typical dimensions for the antenna are a 28 mm inside diameter, an overall axial length of 57 mm, and a base bar/feed bar thickness of 1 mm.

Figure 3:
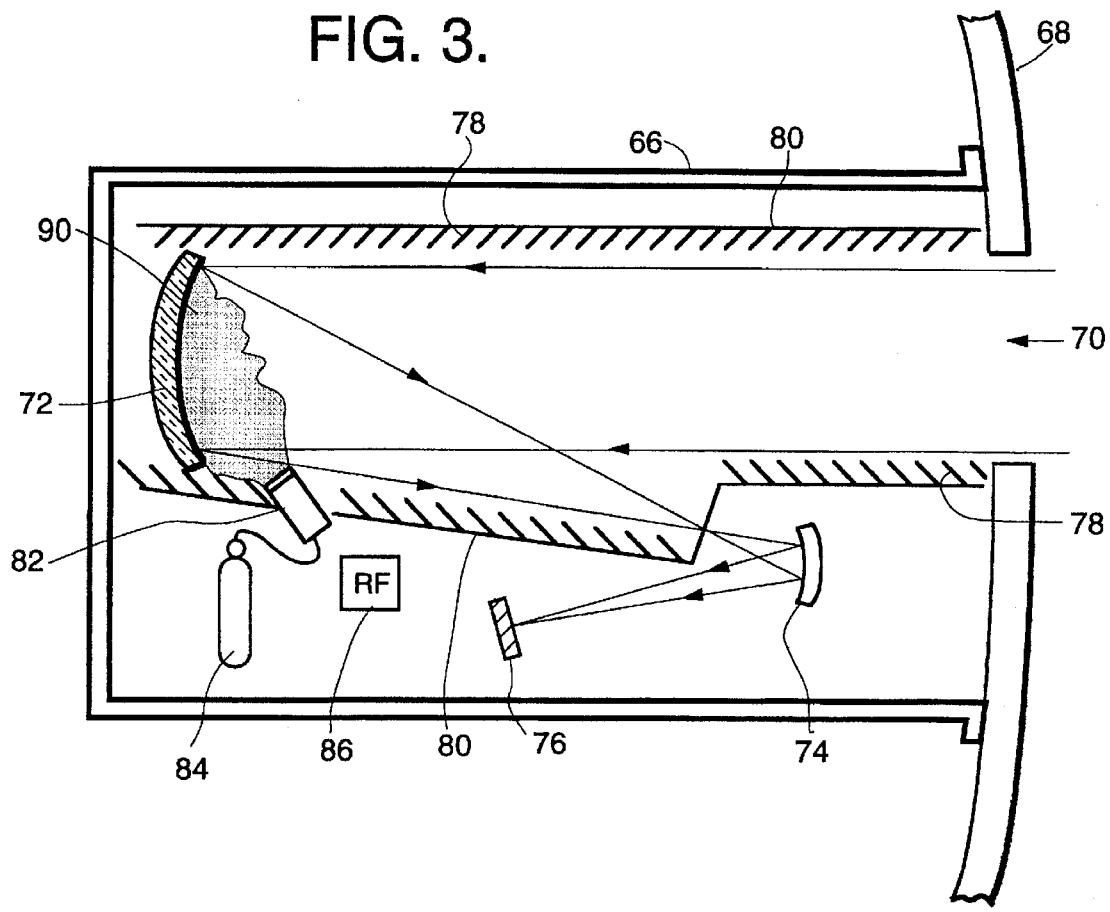
FIG. 3 is a sectional view of a spacecraft telescope with a mirror that is cleaned with the compact rf plasma source of the invention.

The application of the invention in cleaning an optical surface of a spacecraft telescope is illustrated in FIG. 3. The telescope housing 66 is mounted to the spacecraft's outer skin 68, with light entering the telescope through an opening 70 in the skin. The telescope is shown as consisting of a primary mirror 72, a secondary mirror 74 and a focal plane array 76. Light baffles 78 are positioned along the edges of the telescope tube 80 to reject scattered light.

An rf plasma source 82 in accordance with the invention is supplied with gas and/or vapor from a supply tank 84, and is energized by an rf power source 86. The plasma source 82 is shown mounted on the tube 80 that carries the baffles 78, and oriented to direct a cleaning plasma 90 onto the mirror surface.

If the telescope's optical components are warm, such as from solar heating and heat radiated from the spacecraft, an oxygen plasma can be used to remove both condensed hydrocarbon vapors that are outgassed onto the mirror surface from organic materials carried onboard the spacecraft, and the photopolymerized hydrocarbons that result from exposure to the sun. In a demonstration of the invention, a buildup of ultraviolet-absorbing scum on an optical surface had caused a high-resolution telescope-spectrometer (HRTS) to lose its ability to image the sun in its designed far-UV (122 nm) range after only a few orbital periods. An unsuccessful attempt was first made to remove the scum by scrubbing with a solvent. However, an exposure to an oxygen plasma produced with the invention visibly removed the contaminant layer. In other cleaning experiments, the reflectance of a mirror similar to that used on HRTS at 122 nm had degraded from a pristine level of 0.68 to a contaminated level of 0.33, but was restored by oxygen cleaning with the invention to a reflectance of about 0.64. A window had a transmittance at 122 nm of 0.64 in its pristine state, which deteriorated to 0.21 after contamination. After an oxygen plasma cleaning of one side the transmittance increased to 0.39, and was restored to 0.64 when both sides of the window were cleaned.

For hydrocarbon and silicone-containing contaminants that commonly occur from spacecraft outgassing, a plasma formed from an oxygen and $CF_4$ mixture can be used. This type of mixture has previously been used in ground applications. It has also been found that liquid compounds containing both oxygen and flourine, such as hexafluoro acetone, hexafluoro acetone hydrate or trifluoro acetic acid, can be used as a plasma source, thereby reducing the complexity of the equipment that would otherwise be required to handle two separate plasma source components.

Figure 4:
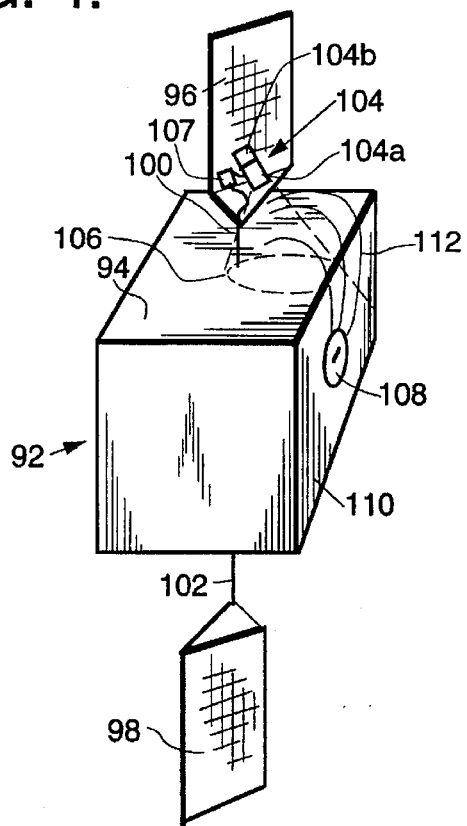
FIG. 4 is a simplified perspective view illustrating the exterior surface of a spacecraft being cleaned with the new plasma source.

The use of the invention to clean an exterior spacecraft surface, such as a thermal radiator, is illustrated in FIG. 4. The body to be cleaned is illustrated generically by a cube 92 having a contaminated upper surface 94; the lower surface would also typically be contaminated. In actual practice, the typical construction for a thermal radiator is thin transparent silica with silver coating on the spacecraft side. Solar panels 96 and 98 are supported respectively by yokes 100 and 102 on opposite sides of the spacecraft. The solar panels rotate once each day to track the sun, while the spacecraft antennas track the earth. A plasma source 104 is shown mounted on one of the solar panels 96 at an angle to the yoke 100, so that an oval shaped spot 106 is exposed to the plasma and cleaned. A similar plasma source could be provided on the other solar panel 98. The diurnal rotation of the solar wing allows the entire radiator panel to be cleaned in a single day; calculations indicate that one such cleaning per month would keep the radiators clean even in worst-case contamination situations. The yokes provide a transmission path for unregulated DC voltage generated by the panels into the spacecraft, and for the return of a regulated voltage to the rf source 107 used for the plasma source.

It has been discovered that special advantages are possible with this type of cleaning by using water vapor plasma instead of oxygen. When ionized in the rf discharge, water vapor decomposes into a number of species that include the highly reactive radicals and radical ions H+, H, OH−, OH, O and O+. Water vapor plasmas have been found to clean hydrocarbons with an effectiveness equal to that of oxygen plasmas.

The easy storage of water offers a major advantage for its use as a cleaning agent in applications such as spacecraft radiator cleaning. Instead of the relatively costly and heavy high pressure cylinder required for oxygen storage, water can be contained in a very compact, light weight vessel at low pressure. The vessel can be kept warm by thermal-blanket design so that the vapor pressure of the water is adequate to supply the plasma generator. An additional advantage of water tankage is that micrometeorite hits on the tank, while ultimately fatal to the cleaning system, pose no hazard to the spacecraft. The water would slowly be lost into space, as opposed to a punctured high pressure oxygen tank that could produce a gas jet with sufficient force to generate unacceptable torques on the spacecraft. The plasma generator 104 is illustrated as including a plasma generation section 104a, to the rear of which a water storage tank 104b is directly coupled.

Water plasma cleaning is not suitable for a cryotelescope application, since any water molecules that fail to become ionized in the rf discharge would freeze onto the optical surfaces and could contaminate these surfaces faster than they could be cleaned. Cryotelescope cleaning, however, requires only small oxygen tanks, since the surface area to be cleaned is very small in comparison to radiator panels (typically not more than about 0.03 m² vs. 5 m² or greater). In addition, the oxygen tank associated with a cryotelescope cleaner would be protected from micrometeorites by the spacecraft structure.

The invention is believed to operate on the helicon wave principal, with electromagnetic helicon waves launched on the plasma and propagating down the magnetic field lines to be absorbed through an electron damping process. This exchange of energy between the wave and electrons leads to energy transfer to the electrons, increasing their temperature and thereby sustaining the plasma.

Numerous conventional mechanisms can be employed to initiate the plasma. These include briefly turning up the power to generate an electric field high enough to break down the gas, waiting momentarily for a cosmic ray to excite electrons sufficiently, briefly increasing the gas pressure so that it breaks down more easily (with or without an increase in power), providing a sharp electrode source to initiate the plasma, and adding a radioactive component to the gas to produce a plasma-initiating radioactive decay.

The invention can also provide a spacecraft charging protection function. A spacecraft surface that is not exposed to the sun can acquire a high negative charge, on the order of −20 kV. This is illustrated by the negative charge symbol 108 on the spacecraft surface 110 in FIG. 4. The charge differential between the plasma and the negative surface charge produces an electric field 112, diverting positive ions from the plasma to neutralize the localized charge 108. This is accomplished with only a relatively small amount of charge diversion, so that the plasma which cleans surface 94 remains essentially charge neutral. A similar charge protection function is disclosed in U.S. Pat. No. 4,800,281 for a Penning-discharge plasma source.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of cleaning a contaminant from a surface of a body in space that is characterized by a surface sputtering energy, comprising:

generating a space-charge neutral plasma that reacts with said contaminant, directing said plasma onto said contaminated surface, at an energy below the surface sputtering energy of said body, and reacting said plasma with said contaminant to remove the contaminant from said surface, wherein said plasma is generated within a plasma tube by:
establishing an axial magnetic field through said tube,
directing a plasma source gas through the tube,
initiating a plasma within the tube from said source gas, and
establishing a helicon wave through said tube to sustain said plasma by applying an rf electrical signal to an antenna which comprises a pair of axially spaced conductive rings extending around said tube, conductive base and rf feed bars extending between said rings on opposite sides of said tube, and an interruption in said feed bar for receiving said rf signal, and wherein said rf signal establishes a current in said antenna that divides symmetrically through said rings from said feed bar.

2. The method of claim 1, wherein said plasma is generated and directed onto said surface at an energy of less than about 20 eV.

3. The method of claim 1, wherein said body comprises an optical device, said surface is a non-cryogenic optical surface of said device, said contaminant comprises condensed hydrocarbon vapor, and said plasma is generated as an oxygen plasma.

4. The method of claim 1, wherein said contaminant comprises a combination by hydrocarbon and silicone-containing contaminants, and said plasma is generated from a liquid compound that includes both oxygen and fluorine.

5. The method of claim 1, wherein said contaminant comprises condensed hydrocarbon vapor, and said plasma is generated as a water vapor plasma.

6. The method of claim 1, further comprising the steps of supporting said plasma tube at a location spaced from said contaminated surface with said plasma directed onto a section of said surface, and imparting a relative rotation between said plasma tube and said surface so that substantially the entire surface area is exposed to the plasma over the course of said rotation.

7. The method of claim 1, wherein said antenna is provided as an integral metal unit, with said rings rigidly supported by and integral with opposite ends of said base bar.

8. The method of claim 1, wherein said axial magnetic field is established by distributing permanent magnets around said tube.

9. The method of claim 1, wherein said body develops a localized electrical charge on a surface other than the surface being cleaned, further comprising the step of neutralizing said localized charge by diverting a portion of said plasma of opposite charge onto said localized charge surface.

10. The method of claim 1, further comprising providing additional magnetic means so that the gradient of said axial magnetic field directs said plasma to drift out of said plasma tube and onto said contaminated surface.

* * * * *